US006044469A

United States Patent [19]

Horstmann

[11] Patent Number: 6,044,469

[45] Date of Patent: Mar. 28, 2000

[54] SOFTWARE PUBLISHER OR DISTRIBUTOR CONFIGURABLE SOFTWARE SECURITY MECHANISM

[75] Inventor: Cay S. Horstmann, Cupertino, Calif.

[73] Assignee: Preview Software, Palo Alto, Calif.

[21] Appl. No.: 08/921,272

[22] Filed: Aug. 29, 1997

[51] Int. Cl.[7] .......... H04L 9/00

[52] U.S. Cl. .......... 713/201; 705/51; 705/57; 705/59

[58] Field of Search .......... 395/186, 187.01, 395/188.01, 200.59; 380/4; 705/51, 54, 57, 58, 59

[56] References Cited

U.S. PATENT DOCUMENTS

| | | | |
|---|---|---|---|
| 4,562,306 | 12/1985 | Chou et al. | 178/22.08 |
| 4,903,296 | 2/1990 | Chandra et al. | 380/4 |
| 4,953,209 | 8/1990 | Ryder, Sr. et al. | 380/23 |
| 5,341,429 | 8/1994 | Stringer et al. | 380/23 |
| 5,628,015 | 5/1997 | Singh | 395/186 |
| 5,642,417 | 6/1997 | Stringer | 380/4 |
| 5,666,411 | 9/1997 | McCarty | 380/4 |
| 5,729,594 | 3/1998 | Klingman | 379/93.12 |
| 5,745,569 | 4/1998 | Moskowitz et al. | 380/4 |
| 5,745,879 | 4/1998 | Wyman | 705/1 |
| 5,864,620 | 1/1999 | Pettitt | 380/4 |

OTHER PUBLICATIONS

Tritech Software, Inc., "Winbolt (Users manual)", pp. 1–23, 1994–1995.

Mach II Software, Inc., "SCUA Plus (Brochure)", pp. 1–14, 1989.

*Primary Examiner*—Robert W. Beausoliel, Jr.
*Assistant Examiner*—Scott T. Boderman
*Attorney, Agent, or Firm*—Burns, Doane, Swecker & Mathis LLP

[57] ABSTRACT

The present invention, generally speaking, provides a software protection mechanism that may be conveniently configured by a software publisher and applied to a software product. Various predefined software protection measures are presented to the software publisher, who selects which protection measures, if any, the software publisher wishes to apply to a software product. The software publisher may select all of the software protection measures, none of the software protection measures, or any logically consistent combination thereof. An option is also provided for the software publisher to provide code implementing a custom software protection mechanism. The software publisher's selections are saved in a license file that is attached to the software product. A Protector Module is also attached to the software product. The Protector Module includes code for each predefined software protection option. When an attempt is made to run the software product, the Protector Module reads the license file and executes code for each software protection option that has been selected. If the software-publisher-defined option is selected, the Protector Module causes publisher-provided software protection code to be executed. The publisher-provided code may be added as part of the license file, for example, or as a separate dynamically loadable code module. The resulting software protection mechanism provides the software publisher complete control over the trade-off between security and user convenience.

9 Claims, 4 Drawing Sheets

SOFTWARE PUBLISHER OR DISTRIBUTOR CONFIGURABLE SOFTWARE SECURITY MECHANISM

BACKGROUND OF THE INVENTION

1. Field of the Invention

The present invention relates to software security.

2. State of the Art

Conventionally, software has been distributed in shrinkwrap form. That is, disk copies of a piece of software have been packaged and shrinkwrapped, usually together with user's manuals. Boxes of shrinkwrapped software are then moved through distribution channels, with payment being made in the usual commercial fashion.

With the widespread use of CD ROMs, expensive manuals are increasingly being dispensed with in favor of on-line manuals, i.e., manuals stored on CD ROM. The software and its documentation have been merged together. Furthermore, with the proliferation of inexpensive, high capacity hard drives, either on a stand-alone computer or a network server, and widespread Internet access (through increasingly high-speed "pipes"), it is now possible to distribute software electronically by allowing customers to download the software from a server. So long as the owner of the software (i.e., the software publisher) retains possession and control of the software being distributed, things go relatively smoothly. The threat of unauthorized copying still remains, but is not especially aggravated as compared to the same threat in the case of conventional software distribution.

Software publishers, however, often do not wish to open and maintain a "storefront" for electronic software distribution, and often do not have sufficient market reach or presence to effectively distribute the software that they have produced. A software publisher may therefore wish to "team up" with one or more "channel partners" in order to effectively carry out electronic software distribution. In such an arrangement, the software publisher puts a software product within the possession and control of one or more (and possibly hundreds of) channel partners.

To facilitate electronic software distribution, clearinghouses have emerged. A clearinghouse functions as a kind of escrow agent for the software publisher and channel partners. Software products for electronic distribution are locked (using encryption). The clearinghouse holds unlock keys for software products and reports to the other parties whenever an unlock key is requested by and released to a customer. The clearinghouse typically also receives payment from the customer and credits the account of the appropriate channel partner.

Electronic software distribution may follow a buy-before-you-try (Buy/Try) model or a try-before-you-buy (Try/Buy) model. Buy/Try is the conventional model used in packaged software distribution: the customer must first buy the package before the customer is able to use it. In the Try/Buy model, the customer is allowed to try the software for a period of time before being required to either buy the software or discontinue use of the software. Try/Buy can operate to the advantage of both the customer (allowing the customer to become acquainted with the product before deciding whether to buy it) and the software publisher (affording more customers an opportunity to try and ultimately buy the product). Try/Buy, however, does introduce further complexity into electronic software distribution. The Software Publishers Association has issued guidelines for Try/Buy electronic software distribution, available at the Web page http://www.spa.org.

Wrapper technology providers are responsible for providing secure encryption technology for Buy/Try and Try/Buy purchases. In the case of Try/Buy, the user downloads and installs the product. The product is altered in such a way that the potential customer can use the product a limited number of times, a limited amount of time, or is functionally "crippled" in some way. At the end of the trial period, the user either purchases the product or deletes the "wrapped" version. If the product is purchased, the clearinghouse provides the customer a key that "breaks the shrinkwrap" and permanently installs the product.

One impediment to the widespread use of wrapping technologies has been their inflexibility, especially in the area of software protection mechanisms, i.e., mechanisms for allowing limited authorized use and disallowing unauthorized use. Software protection necessarily entails a trade-off between security for the software publisher and convenience for the software end user. Security may be increased by binding a file containing software protection information to the end user's operating environment. In general, various mechanisms for achieving this binding are known, some of which are described hereinafter.

There nevertheless remains a need for a mechanism that allows a software publisher to conveniently configure a software protection mechanism for a particular software product to achieve an appropriate trade-off between security and user convenience for that product.

SUMMARY OF THE INVENTION

The present invention, generally speaking, provides a software protection mechanism that may be conveniently configured by a software publisher and applied to a software product. Various predefined software protection measures are presented to the software publisher, who selects which protection measures, if any, the software publisher wishes to apply to a software product. The software publisher may select all of the software protection measures, none of the software protection measures, or any logically consistent combination thereof. An option is also provided for the software publisher to provide code implementing a custom software protection mechanism. The software publisher's selections are saved in a license file that is attached to the software product. A Protector Module is also attached to the software product. The Protector Module includes code for each predefined software protection option. When an attempt is made to run the software product, the Protector Module reads the license file and executes code for each software protection option that has been selected. If the software-publisher-defined option is selected, the Protector Module causes publisher-provided software protection code to be executed. The publisher-provided code may be added as part of the license file, for example, or as a separate dynamically loadable code module. The resulting software protection mechanism provides the software publisher complete control over the trade-off between security and user convenience.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

The present invention may be embodied in a "wrapping" software tool for use in electronic software distribution. In the context of the present invention, the wrapping tool functions as a Protection Builder Tool and will be referred to as such. Desirably, such a tool should allow a software publisher to conveniently configure a software protection mechanism for a particular software product to achieve an appropriate trade-off between security and user convenience for that product. The manner in which this objective is achieved will be described in detail. Further details regarding electronic software distribution and software self-modification, respectively, may be found in U.S. application Ser. Nos. 08/921,394 and 08/921,402 (Atty. Dkt. Nos. 031994-002 and 031994-007), filed on even date herewith and incorporated herein by reference.

Figure 1:
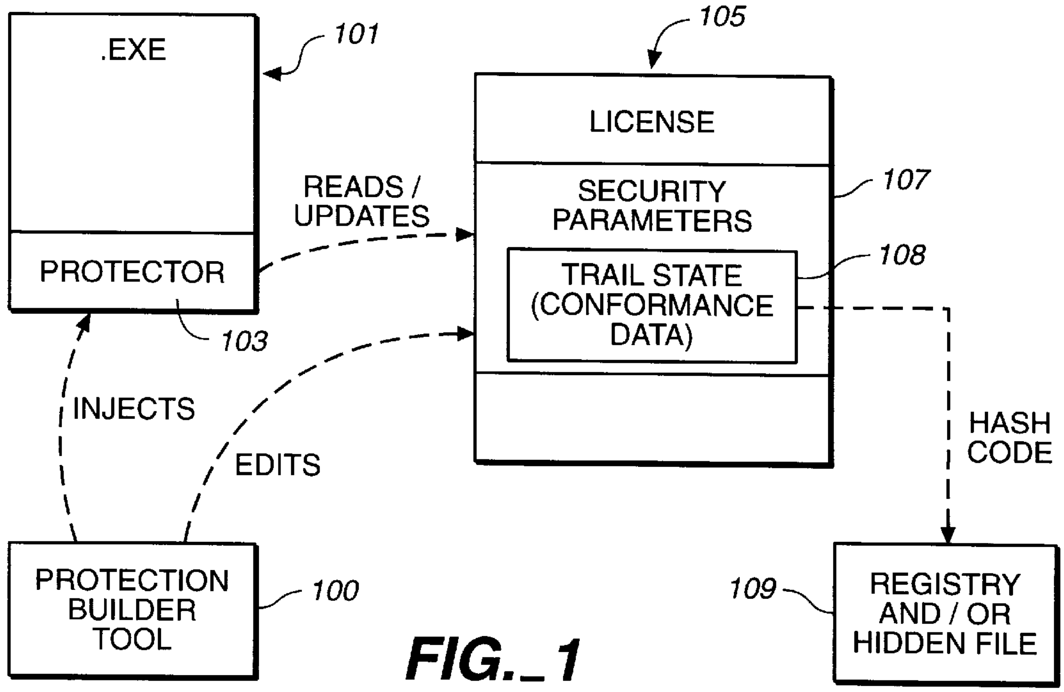
FIG. 1 is a block diagram illustrating a software binding software protection scheme.

Referring to FIG. 1, in an exemplary embodiment, a Protection Builder Tool 100 is used to "inject" an executable file 101 with a code module 103, referred to herein as the Protector Module, that allows or disallows use of a software product (e.g., a Try/Buy-distributed software product) based on the "trial state," i.e., usage conformance information used to determine whether further use should be allowed. The Protection Builder Tool is also used to create and edit a license file 105. The license file 105 contains security parameters 107 that determine what software protection security measures are to be applied. Parameters governing use are stored in a trial state section 108 which the Protector 103 reads in order to determine if a particular attempted use should be allowed or disallowed. The Protector Module 103 may use any of a number of commonly used criteria for determining that an attempted use should be disallowed, such as "too many tries", "past expiration date", etc. The Protector Module 103 also updates the trial parameters 108 with each use.

Although in an exemplary embodiment license information is stored in a license file, in general, the license information may be stored elsewhere, e.g., appended to the executable, stored in the operating system registry, obtained through a network connection, etc. Furthermore, other methods besides code injection exist to add code to an existing executable and could be used equally well. The additional code can be compiled into the existing executable, or a loader can be provided that first performs protection functions and then loads the actual executable.

One potential way to thwart software protection is to simply keep downloading a trial version of the software, with the result that an "infinite trial" is obtained. To protect against infinite trial, the software must "leave tracks" on the user's machine such that a subsequent copy can ascertain that a previous copy has already been used on the user's machine. This may be accomplished using a process sometimes known as software binding.

Referring still to FIG. 1, in software binding, when the software is run, information is stored in a location 109 on the user's machine, for example in the operating system registry (in the case of the Windows™ operating system) or in hidden files the names and locations of which are carefully chosen to disguise their presence. This information is used to indicate that a copy of the software product has been run and the user is not eligible to run it again, and may be used to prevent any subsequent version of the same software product from being run. In an exemplary embodiment, in addition to other identifying information, a checksum of the license file is stored in a hidden location on the user's machine. Whenever the software product is used, the Protector 103 calculates the checksum of the visible license file and checks it against the checksum (or cryptographic fingerprint) of the original license file. If the checksums are different, use is disallowed. The checksum may be, for example, a hash code produced from the trial state 108. If a new copy of the program is downloaded, its license file will have a different set of information (e.g., the date of first trial will be different), and with an extremely high probability, the hash code will change.

Most software publishers recognize the need for protection against infinite trial. Some software publishers, however, prefer to simply trust the end users, the vast percentage of which are not inclined to commit any egregious abuse. Furthermore, a customer may try out software then forget they have tried it. Or someone else may download a trial copy of a software program onto the customer's machine. Some time later, when the customer downloads another copy, it will not work if registry binding is used. Rather than risk dissatisfaction of would-be customers, some software publishers would rather risk infinite trial by a small percentage of unscrupulous users.

Another threat is the dissemination of a license file taken from a purchased copy of the software product. By combining such a license file with a trial copy of the software product, the equivalent of a paid-up copy may be obtained. The license file will typically contain a warning against this type of misappropriation and will further display the name and address of the "true" license holder. However, because the purchaser supplies the latter information and there is no practical way to check its authenticity, it may easily be faked. Further protection may therefore be desired against this kind of attack.

Figure 2:
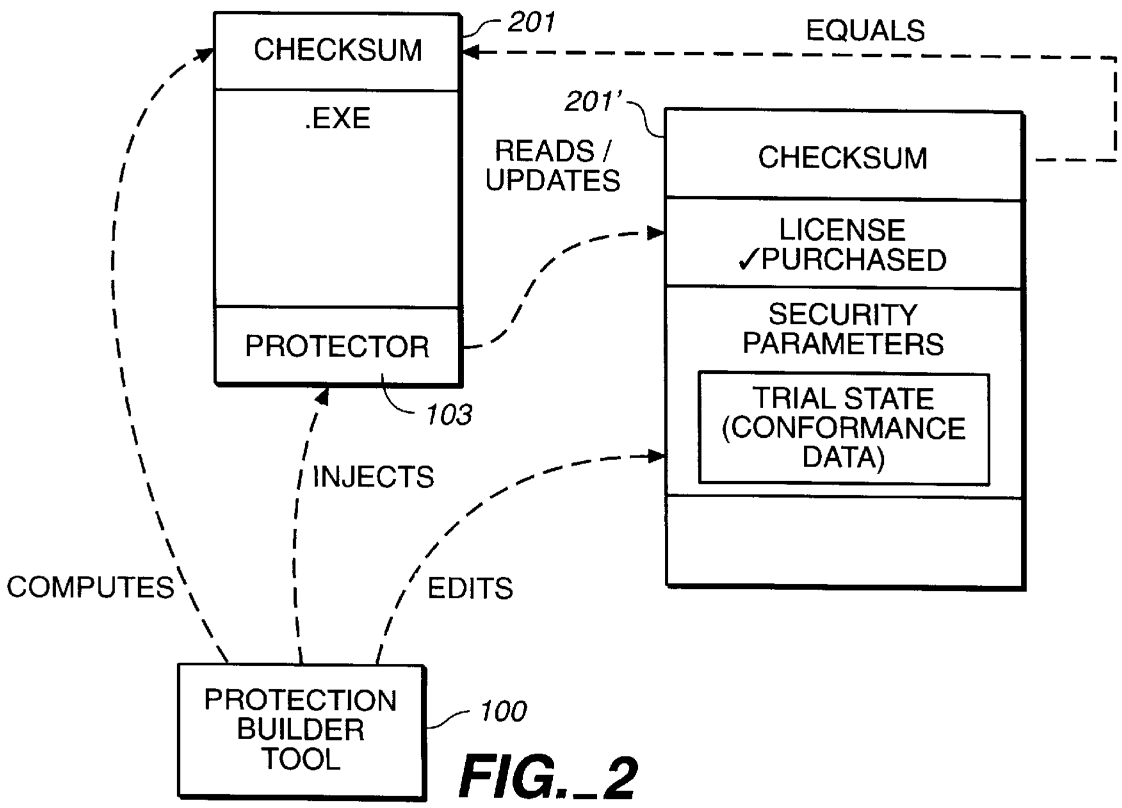
FIG. 2 is a block diagram illustrating an executable binding software protection scheme.

Referring to FIG. 2, another binding mechanism is executable binding, also known as application binding. In executable binding, when an executable is installed, a unique identifier, e.g. checksum 201, is attached to it and is also stored in the license file. That is, every time the executable is installed, it gets a different "branding. " To protect against a recombination attack of the type described, the Protector 103 compares the unique identifier 201 of the executable with the unique identifier 201' of the license. If the two do not match, access is disallowed.

Some software publishers, however, rely on the possibility of recombination for customer support purposes. Then if something goes wrong with the program (e.g., the user accidentally erases the license file, or buys a new computer, or the user's hard disk crashes), the user may be instructed to download a new license file for use with the program or can be emailed a new license file. To such software publishers, executable binding may not be desirable.

Figure 3:
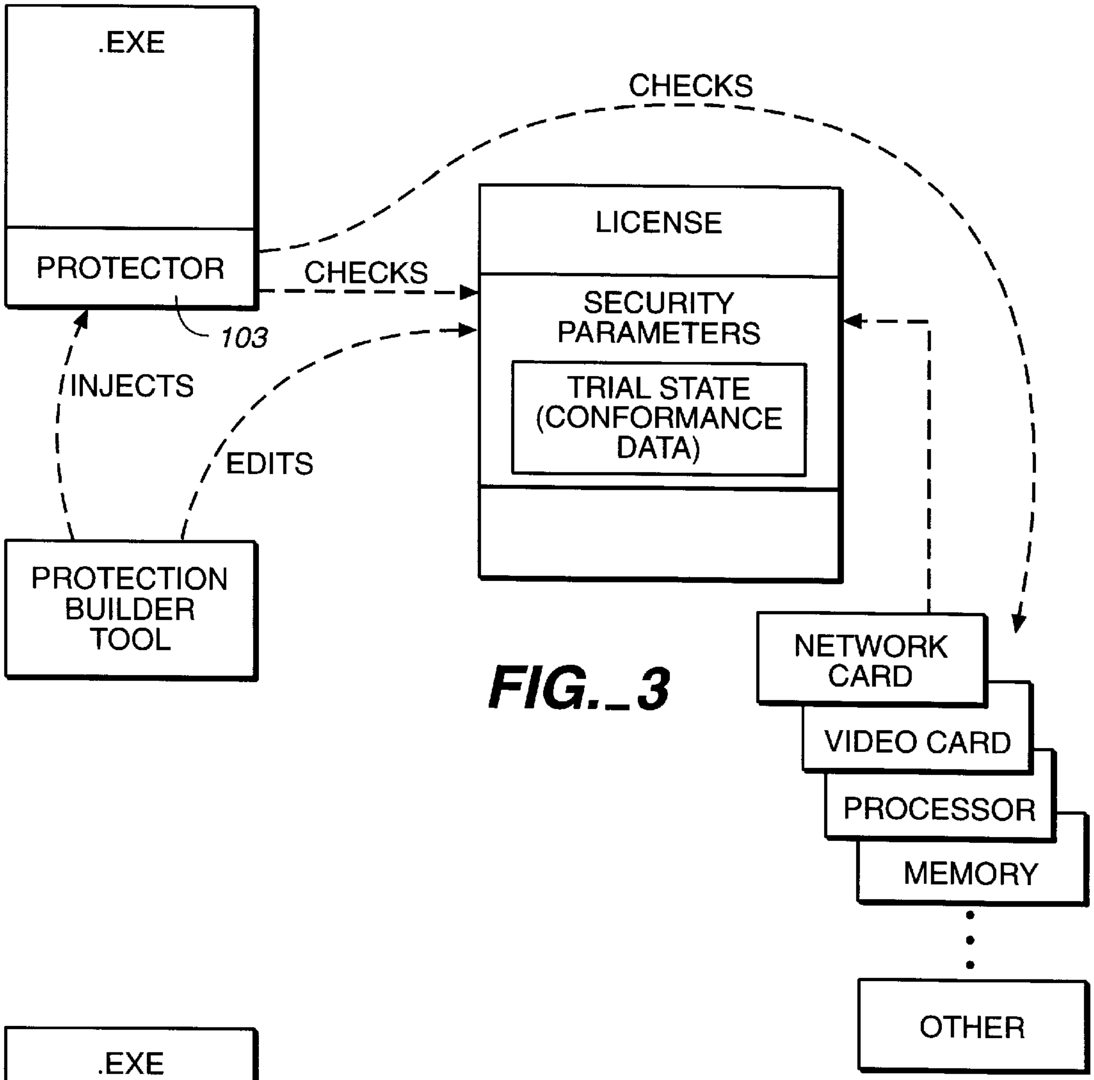
FIG. 3 is a block diagram illustrating a hardware binding software protection scheme.

An alternative to executable binding is hardware binding. Referring to FIG. 3, in hardware binding, the Protector 103 takes a "snapshot" of the machine on which it is running and saves the snapshot in the license file. If the license file is moved to a different machine, the Protector will not regard it as a valid license. The snapshot of the machine may include such details as the type of video card, the amount of memory, the type of processor, etc. If a network card is present, then the unique serial number of the network card may be used.

A problem with this type of protection scheme is that machines do get upgraded such that the snapshot of a machine that has been upgraded will no longer match the stored snapshot. In an exemplary embodiment, this problem is minimized by using approximate matching criteria that allow for incremental changes to be made to the machine. If the machine snapshot has changed incrementally in a manner determined to be allowable, then the Protector 103 will save the new snapshot in the license file. Nevertheless, this protection scheme inevitably entails some degree of frustration on the part of customers and is therefore not favored by some software publishers.

Some software publishers use hardware binding in areas of the world where software piracy is more widespread and do not use hardware binding where software piracy is not prevalent. Also, some publishers explicitly allow the use of their software on multiple machines, preventing the use of machine binding. Preferably, the present Protection Builder Tool allows protection options to be customized for different locales. When Protector code runs, it is able to ascertain locality information, e.g., from the operation system. The Protector code may then execute different protection options depending on the selections of the software publisher.

Unlike existing software wrapping tools, which are used by wrapper technology providers to perform a slightly customized wrapping of each separate software product, the present protection scheme may be embodied in a general-purpose wrapping tool, including the present Protection Builder Tool, the wrapping tool may be used by the software publisher to perform its own wrapping "instantly" on site, and allows the software publisher to exercise various choices including what protection scheme or combination of protection schemes should be employed. The trade-off between security and customer convenience is therefore entirely within the software publisher's control.

Figure 4:
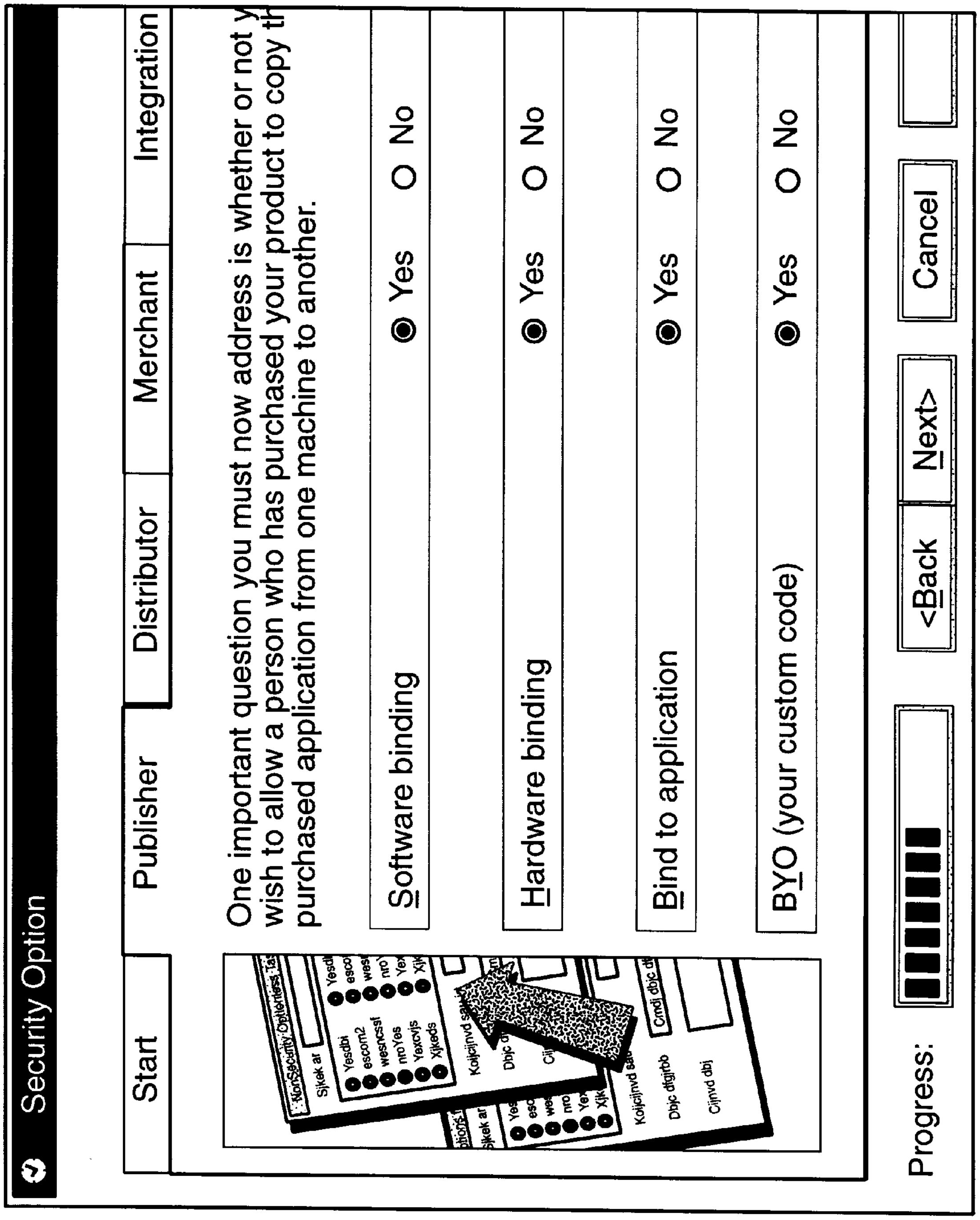
FIG. 4 is a screen shot of a screen display used within a software wrapping tool to a prompt a software publisher to select a software protection scheme or combination of software protection schemes.

Referring to FIG. 4, a screen shot is shown of a display screen that may be used to prompt the software publisher to select a protection scheme or combination of protection schemes. Although three particular protection schemes have been described, any number of different protection schemes may be offered. Furthermore, the software publisher may specify "Bring Your Own" (BYO). This option allows the software publisher to provide code implementing its own particular protection scheme. The Protector Module will then execute this code.

Figure 5:
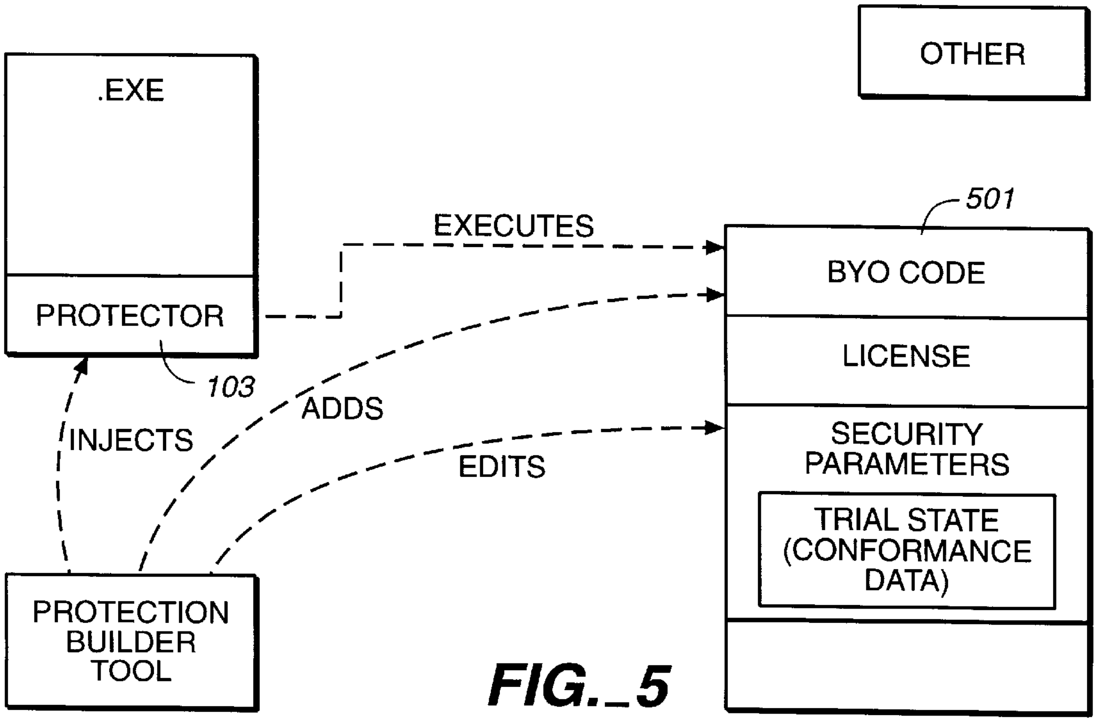
FIG. 5 is a block diagram illustrating a mechanism allowing a software publisher to provide code implementing its own software protection scheme.

Referring more particularly to FIG. 5, the Protector 103 with which the executable is injected is preferably a standard code module that does not vary from product to product. When the Protector 103 is run, it goes down a checklist, running code for each protection measure selected by the software publisher. One of the security parameters is BYO. If BYO is selected, then the Protector 103 will run protection code 501 (attached to the license file, for example) which is used to perform additional checks. In this manner, the Protector module 103 remains the same but additional capabilities may be easily added.

Figure 6:
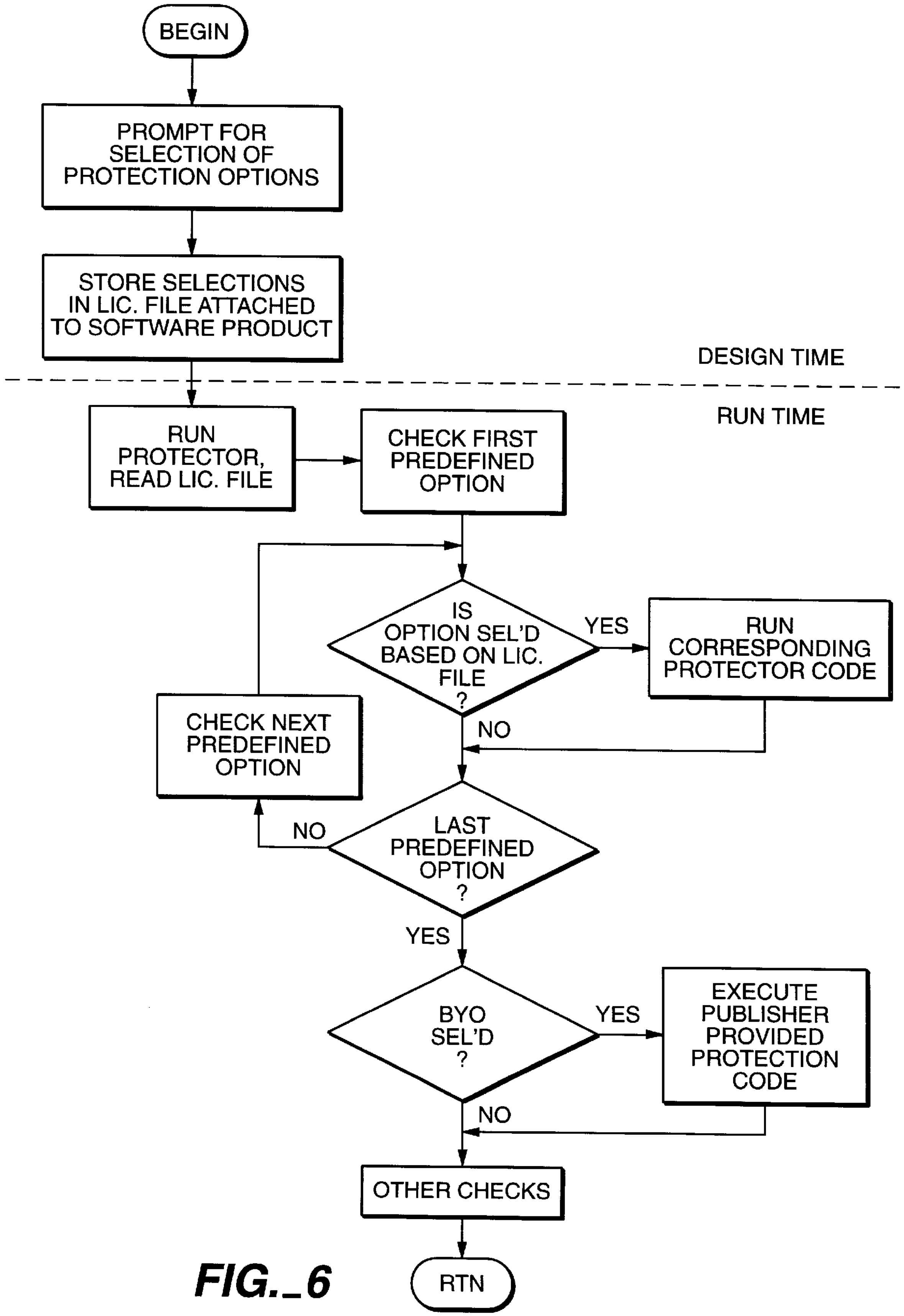
FIG. 6 is a flowchart illustrating the present software publisher configurable software protection mechanism.

Referring to FIG. 6, a flowchart of the present software publisher configurable software protection mechanism is shown. When the software publisher uses the Protection Builder Tool, the software publisher is prompted to select from a variety of predefined software protection measures (software binding, executable binding, hardware binding, etc.). The software publisher may select all of the available software protection measures, none of them, or any logically consistent combination thereof. The software publisher ┌ss selections are then stored in a license file that is attached to the software product. Also attached to the software product is the Protector Module, previously described.

When an attempt is later made by a user to run the software product, the Protector runs and reads the license file, including the software publisher ┌ss selections (i.e., the software protection parameters). The Protector refers to the software protection parameters to determine whether a first predefined software protection option has been selected. If so, the Protector runs code implementing that software protection scheme and then determines whether further options exist. If the first software protection option has not been selected, then the Protector checks directly for further options. If the next option is selected, then its code is executed, and so on.

When the last predefined option has been checked and, if selected, run, the Protector checks to see if BYO has been selected. If so, then the Protector causes custom protection code provided by the software publisher to be executed.

The Protector Module routinely performs various other checks as well (e.g., expired data, insufficient payment, etc.). After the foregoing checks have been performed, these checks are then made. Depending on the result of the various checks, the Protector returns to either run the protected software or display a message that access has been disallowed.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed:

1. A method of protecting against unauthorized use of a software product, comprising the steps of:

a software publisher or distributor, using a software wrapping tool, adding Protector code to the software product and selecting from among a plurality of protection options whereby selection is made from among varying machine-determinable conditions under which the Protector code allows the software product to be used, the Protector code including code for implementing a plurality of predefined protection options;

recording protection options selections of the software publisher or distributor and attaching a resulting record to the software product in a tamper-resistant way;

distributing the software product with the Protector code added; and when an attempt to access the software product is made, the Protector code reading recorded selections of the software publisher or distributor and executing code corresponding to selected protection options, if any.

2. The method of claim 1, comprising the further step of providing license information, including license conditions, accessible to the Protector code, the Protector code measuring a program user's conformance to the license conditions and recording conformance data.

3. The method of claim 2, wherein in accordance with one of said predefined protection options information related to said conformance data is stored obscurely on a user's machine to effect a binding.

4. The method of claim 2, wherein in accordance with one of said predefined protection options an executable portion of said software product is marked, binding it to said conformance data.

5. The method of claim 2, wherein in accordance with one of said predefined protection options information describing a computer hardware environment is recorded along with said conformance data.

6. The method of claim 5, wherein an attempt to access the software product causes code to be executed that checks correspondence of a current computer hardware environment and said information describing said computer hardware environment.

7. The method of claim 6, wherein only substantial correspondence, not exact correspondence, is required in order for access to the software product to be allowed.

8. The method of claim 1, wherein in accordance with a particular protection option the software publisher or distributor supplies code to be executed by the Protector code, in addition to any other predefined protection options selected by the software publisher or distributor.

9. The method of claim 1, wherein the software publisher or distributor specifies different protection options selections for different geographic locales and, when an attempt to access the software product is made, the Protector code ascertains locality information and executes code corresponding to selected protection options, if any, for the current geographic locale.

* * * * *